(No Model.)
C. W. ISBELL.
PROCESS OF CONCENTRATING AMMONIACAL LIQUOR.
No. 351,865. Patented Nov. 2, 1886.
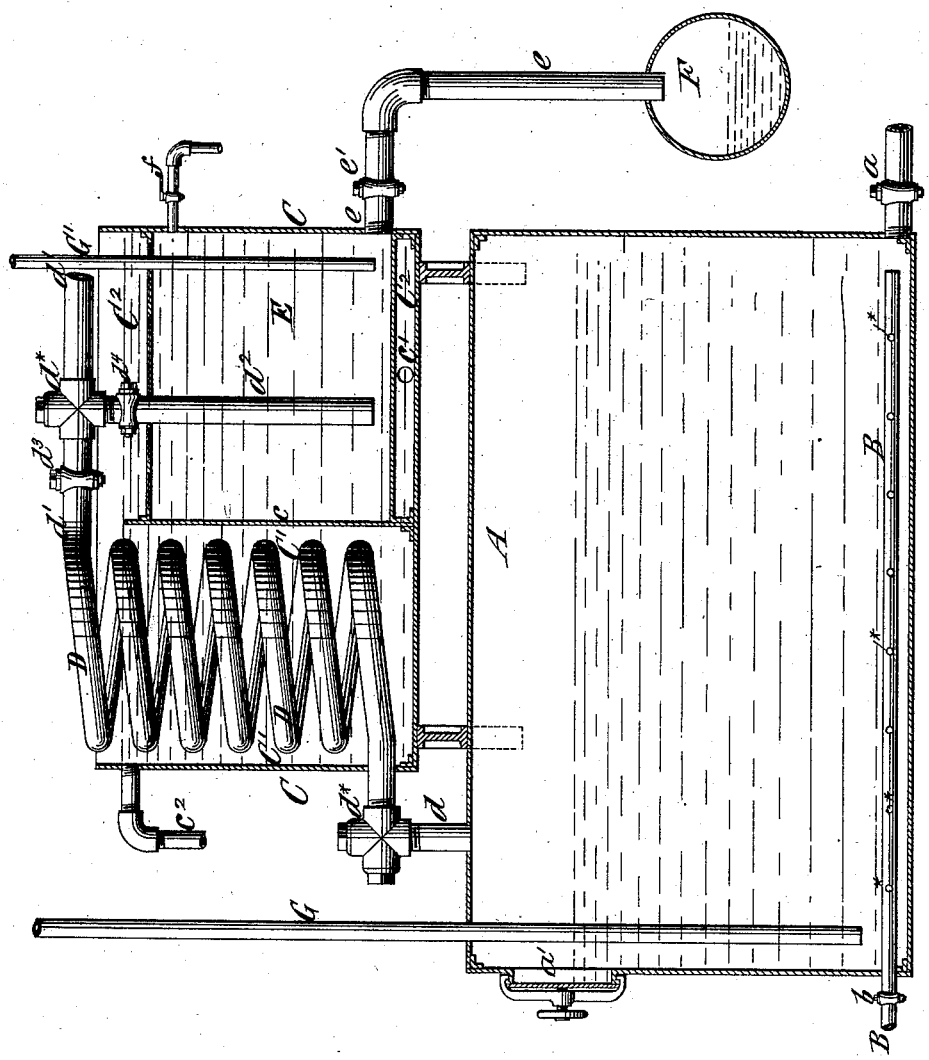
Witnesses:
Inventor:
Charles W. Isbell
by his Attys
Brown & Hall

UNITED STATES PATENT OFFICE.

CHARLES W. ISBELL, OF NEW YORK, N. Y.

PROCESS OF CONCENTRATING AMMONIACAL LIQUOR.

SPECIFICATION forming part of Letters Patent No. 351,865, dated November 2, 1886.

Application filed March 25, 1885. Serial No. 160,026. (No model.)

*To all whom it may concern:*

Be it known that I, CHARLES W. ISBELL, of the city and county of New York, in the State of New York, have invented a new and useful Improvement in the Method of Concentrating Ammoniacal Liquor, of which the following is a specification.

In the manufacture of illuminating-gas from bituminous coal the weak ammoniacal liquor of gas-works is obtained in large quantity, but of so little strength that it is ordinarily thrown away, although it would have a certain commercial value if it were of a strength sufficient to pay for shipping it.

The object of my invention is to effect the concentration of this weak ammoniacal liquor at the gas-works in order to bring it to a strength which will render it profitable to ship it to market, and thereby enable gas-works, more especially those of small capacity, to utilize and obtain a sale for what has ordinarily been a waste product.

My invention consists in an improvement in the method of concentrating the weak ammoniacal liquor of gas-works, consisting in supplying a suitable quantity of the weak liquor to a closed heating-vessel, and supplying a further quantity of the same weak liquor to a receiving-vessel submerged in cooling-water, in then heating the liquor in said heating-vessel and passing the ammonia vapor thus driven off through a cooling worm or coil above the heating-vessel, so that all aqueous vapor will be condensed and returned to the heating-vessel, and in finally introducing the ammonia vapor into the liquor in the receiving-vessel, to increase the strength thereof.

In the accompanying drawing I have represented an apparatus which may be employed in carrying out my invention. The drawing represents a sectional elevation of such apparatus. This apparatus forms no part of my present invention, and is only illustrated as one example of an apparatus which may be employed in carrying out my improved method. The apparatus itself forms the subject of my application for Letters Patent, Serial No. 160,025, filed March 25, 1885.

A designates a closed vessel or vat, which may be of cylindric or other form, and constructed of plate metal, wood, or any other suitable material.

B designates a pipe provided outside the vessel with a cock or valve, $b$, and extending into and nearly through the vessel. The portion of the pipe B which is within the vessel is provided with or has numerous holes or perforations, *, so that steam introduced through the pipe will be discharged into the ammoniacal liquor which is placed in the closed vessel and serve to heat the same. Instead of discharging free steam into the liquor, I may employ a steam-coil arranged within the vessel, which will effect the heating of the liquor by radiation. The vessel A is provided with a discharge cock or valve, $a$, at the bottom, and has also a man-hole, $a'$, through which access can be had to the vessel for cleaning it or for any other purpose.

C designates an open tank or vat, which may be of wood or metal, and which is arranged above the vessel A. It is provided with a partition, $c$, dividing it into two compartments, $C'$ $C^2$. In the compartment $C'$ is arranged a worm or coil of pipe, D, one end of which is connected at $d$ with the vessel A and the other end of which is prolonged to form a pipe, $d'$, from which a pipe, $d^2$, extends downward, for a purpose hereinafter described. The pipe $d^2$ is connected with the pipe $d'$ by a T-fitting, $d^*$, and between the T-fitting and the worm or coil is a valve or cock, $d^3$, by which the passage from the worm or coil and pipe $d'$ may be controlled. In the pipe $d^2$ is a similar cock, $d^4$. With the pipe $d'$ may be connected a supply-pipe for ammoniacal liquor, which may be taken from an elevated reservoir or tank, or supplied directly by a pump through the pipe $d'$.

In the compartment $C^2$ of the vat or tank C is arranged a receiving-vessel, E, which may be cylindric, and which extends from the partition $c$ to the opposite end of the tank or vat C. This partition and end of the tank may indeed form the ends of the reservoir, the latter consisting of a headless cylinder of sheet or plate metal connected in a water-tight manner to the partition $c$ and the opposite end of the tank or vat. From the receiving-vessel E extends a pipe, $e$, in which is a cock, $e'$, and which communicates with the shipping vessel or tank F, which may be of any suitable form and material. The receiving-vessel E is also provided with a test-cock, $f$, through which a portion of its contents may be withdrawn for testing.

The compartment $C^2$ of the tank or vat C is provided with an inlet, $c'$, for feed or cooling water, which surrounds the receiving-vessel E, and in which the latter is immersed. The partition $c$ is lower than the walls of the tank or vat C, and hence the water, after filling the compartment $C^2$, will overflow into the compartment $C'$, and will there serve to cool the worm or coil D and condense the aqueous vapor carried off in suspension. In this case the cold feed-water introduced at the inlet $c'$ will be somewhat warmed before passing into the compartment $C'$, and will therefore not act to cool the worm or coil so energetically as to produce the carbonate of ammonia therein and clog the worm or coil. An overflow-pipe, $c^2$, leads from the compartment $C'$.

It will be observed that in the pipe $d$, I have introduced a T-fitting, $d^*$, and this, as well as the T-fitting $d^*$ in the pipe $d'$, provides for readily cleaning these pipes, it being only necessary to remove the screw-plugs which close the outer branches of the T-fittings.

A safety-pipe, G, extends from within the vat or vessel A to a considerable height above the same and prevents the liability of any explosion. A similar safety-pipe, $G'$, leads from the receiving-vessel E.

The operation performed in carrying out my invention is as follows: Weak ammoniacal liquor is introduced through the supply-pipe $d'$ and coil D into the vessel A until the latter is filled to the level indicated by the dotted lines therein, the cock $d^4$ being then closed. The cock $d^3$ is then closed and the cock $d^4$ opened, and the weak ammoniacal liquor is introduced into the receiving-vessel E until the latter is nearly or quite full, and the cock $d^3$ is afterward again opened. Steam is now introduced through the pipe B to heat the ammoniacal liquor in the vessel or tank A, and to thereby drive off the free ammonia contained therein in the form of vapor. A certain amount of aqueous vapor will be carried in suspension by the ammonia vapor, and in passing through the worm or coil D all or nearly all of such aqueous vapor will be condensed, and will flow back into the vessel A, while the ammonia vapor will pass onward and be delivered through the pipes $d'$ $d^2$ into the liquid contained in the receiving-vessel E, by which such vapor will be absorbed. When the contents of the receiving-vessel E as drawn from the test-cock $f$ indicates the desired strength of liquor, the cock $e'$ is opened and the liquor discharged from the receiving-vessel E into the shipping tank or vessel F, which is afterward closed and ready for market. Any suitable casks, vessels, or packages which will prevent the escape of ammonia may be employed for shipping this strong liquor. Those vessels or packages in which glycerine has been contained, and which are known as "glycerine-packages," will well answer the purpose. To obtain from the liquor in the vessel or tank the last trace of free ammonia, I may introduce lime thereinto; but this forms no part of my invention. After the ammonia has been driven off from the contents of the vessel A the spent liquor may be withdrawn through the cock or valve $a$.

Although my invention is more particularly intended for concentrating ammoniacal liquor from gas-works, it may be employed for concentrating weak liquor derived from other manufactures.

The introduction of the ammonia vapor into ammoniacal liquor or water contained in a receiving-vessel which is submerged in cooling-water is very advantageous, because the cooling-water abstracts from the contents of said vessel the heat produced by the condensation of ammonia therein and enables the operation to be performed much more rapidly and continuously.

I am aware that it is not new to employ in apparatus for manufacturing aqua-ammonia a heating-vessel wherein the ammoniacal liquor is placed and from which the ammonia vapor is driven off and conducted through a worm for the purpose of condensing the vapor; and I do not, therefore, claim such a method as is described in patent to Fales, No. 158,265, December 29, 1874.

In carrying out my method I not only supply the heating-vessel A with weak ammoniacal liquor, but I also supply this same weak liquor to the vessel E, which is submerged in the cooling-water. The ammonia vapor driven off from the vessel A is not condensed in the worm or coil D, but is simply passed through said worm or coil for the purpose of condensing any aqueous vapor that may be carried in suspension by the ammonia vapor and returning such condensed aqueous vapor or water to the heating-vessel A.

What I claim as my invention, and desire to secure by Letters Patent, is—

The improvement in the method of concentrating the weak ammoniacal liquor of gas-works, consisting in supplying a suitable quantity of the weak liquor to a closed vessel, and also supplying a further quantity of the weak liquor to a receiving-vessel submerged in cooling-water, in then heating the liquor in said heating-vessel, and passing the ammonia vapor thus driven off through a cooling worm or coil above the heating-vessel, so that all aqueous vapor will be condensed and returned to the heating-vessel, and in finally introducing the ammonia vapor into the weak liquor in the receiving-vessel to increase the strength thereof, substantially as herein described.

CHAS. W. ISBELL.

Witnesses:
  C. HALL,
  FREDK. HAYNES.